Patented Aug. 26, 1947

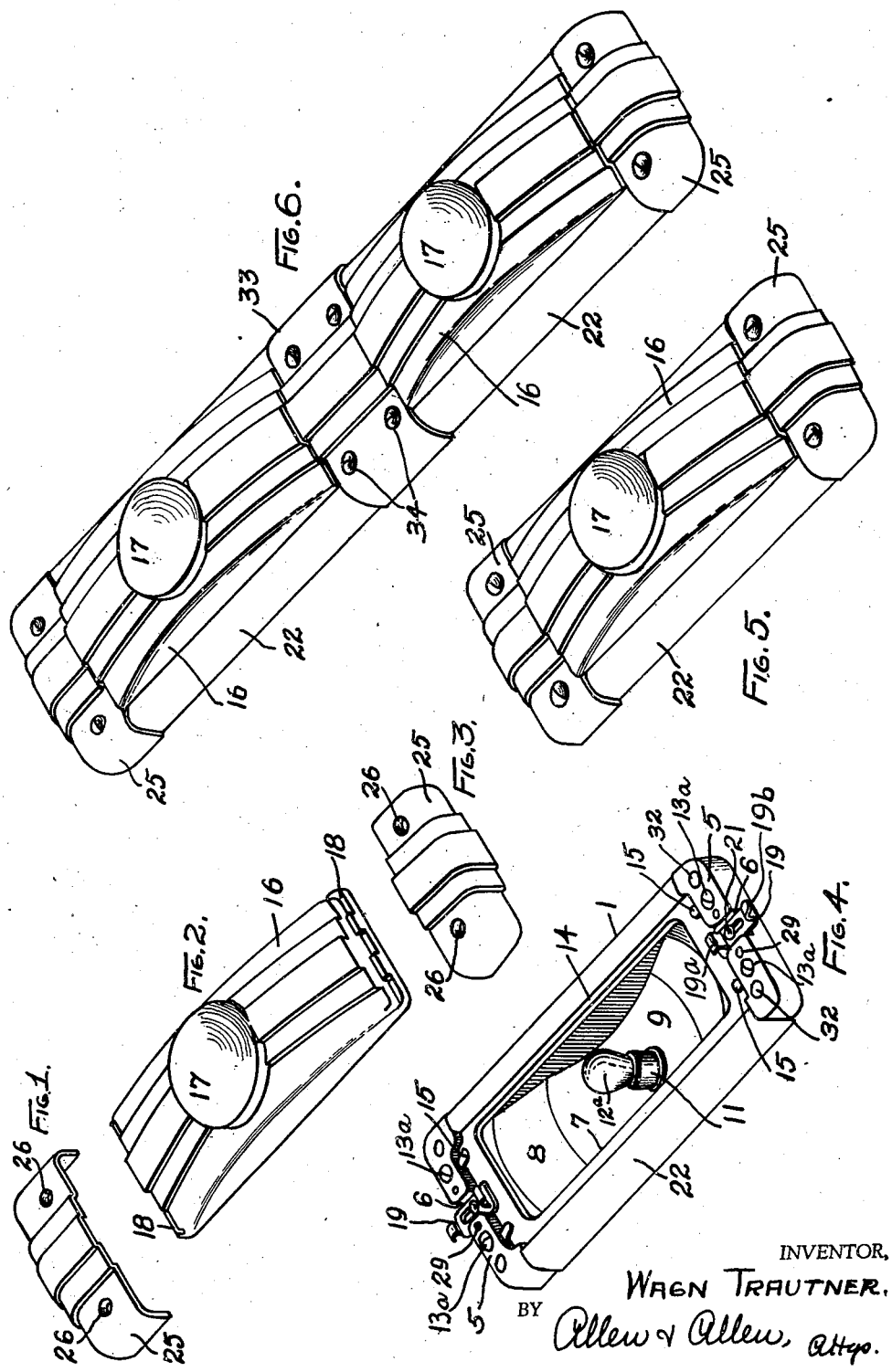

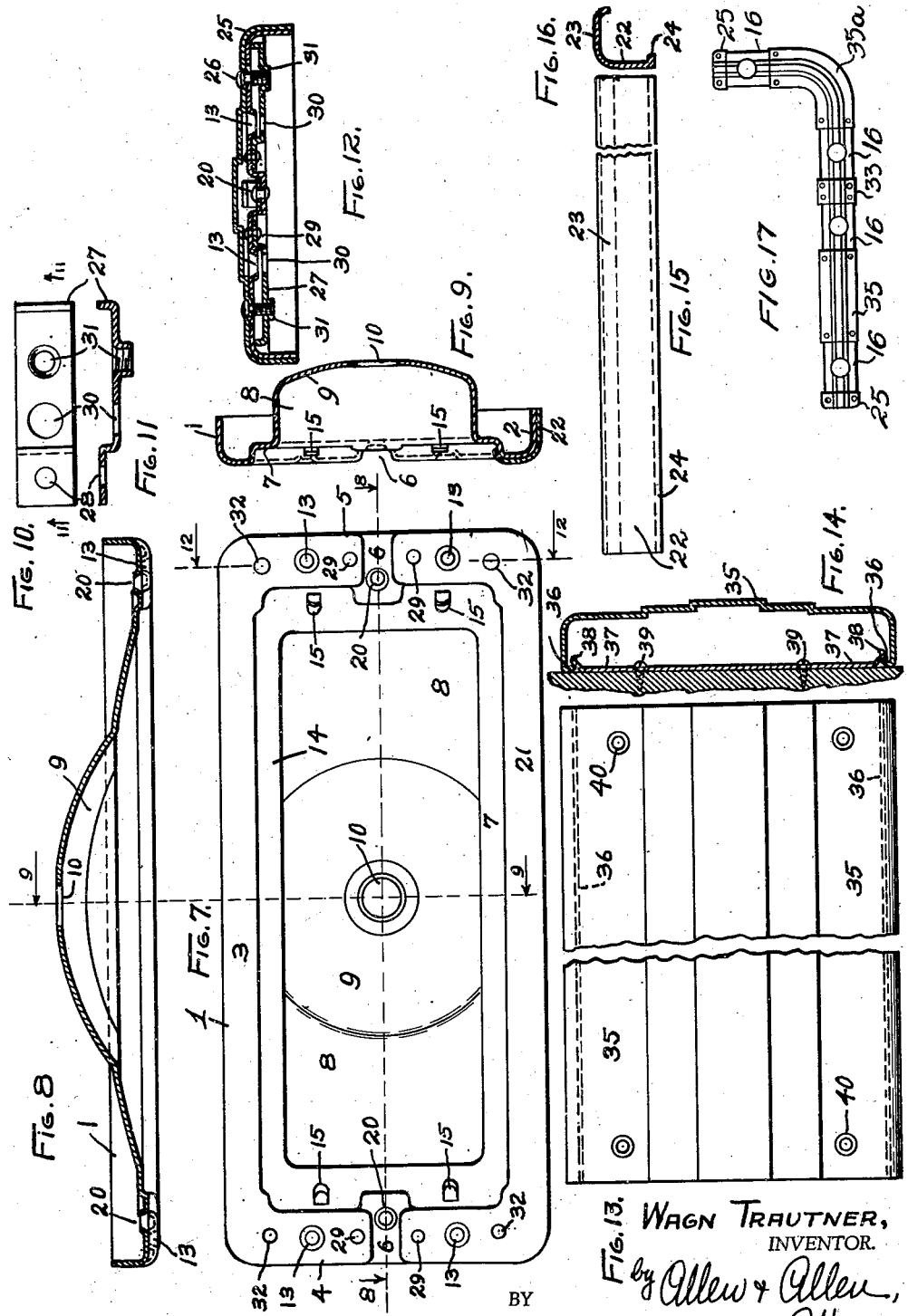

2,426,534

UNITED STATES PATENT OFFICE 2,426,534

DECORATIVE LIGHT AND ASSEMBLY FOR VEHICLES

Wagn Trautner, Hamilton, Ohio, assignor, by mesne assignments, to Noma Electric Corporation, New York, N. Y., a corporation of Maryland Application May 24, 1944, Serial No. 537,106

7 Claims. (Cl. 240—7.35)

My invention has to do with illuminating fixtures and assemblies of a type, which, while not confined to use in vehicles, is especially adapted for such use.

One of the objects of my invention is the provision of a simple, inexpensive but highly decorative illumination unit which either may be used alone or, along with suitable connecting means, may be employed in groups, assemblies or elongated multiple units. Thus it is an object of my invention to provide a structure or series of them which can be adapted to ceiling or corner or side wall lighting problems in accordance with the structural design and interior decoration of the vehicle. It is an object of my invention to provide standard units which may be used alone or which may be assembled in a wide variety of different groupings by means of standard connecting means. It is an object of my invention to provide standard illumination units which may be made into assemblies either in juxtaposed position or in separated but interconnected positions, the separation of the individual illumination units being under the control of the designer of the vehicle. One of my objects thus becomes the provision of a lighting assembly which has the continuity required for proper interior decoration and trim but in which the number of illumination units and the placement thereof can be controlled either in accordance with appearance or in accordance with the desired intensity of illumination at divers points in the illuminated area.

Further objects include the provision of a structure which is easily assembled and installed, and in which the individual units and the interconnecting parts may readily be disassembled for cleaning, repair or replacement, as well as for relocation of the lighting units when that is found desirable.

These and other objects of my invention which will be set forth hereinafter or will be apparent to one skilled in the art upon reading these specifications, I accomplish by that certain construction and arrangement of parts of which I shall now describe an exemplary embodiment of the lighting unit and exemplary assemblies thereof. Reference is made to the accompanying drawings wherein:

Figures 1, 2, 3 and 4 constitute together a semi-exploded view of an individual illumination unit.

Figure 5 is an assembled view of such a unit.

Figure 6 is an assembled view of a gang of two units.

Figure 7 is a plan view of a base, while Figures 8 and 9 are respectively longitudinal and transverse sections thereof.

Figure 10 is a plan view of an attachment means used in connection with the base while Figure 11 is a sectional view of it.

Figure 12 is a sectional view of the base taken along the line 12—12 of Figure 7.

Figure 13 is a plan view of a unit connecting strip while Figure 14 is a sectional view thereof including an elevation of an attaching bracket.

Figures 15 and 16 are respectively an elevation and a section of a base edging member.

Figure 17 is a plan view of a combination layout employing several of the members shown individually above.

Referring first to Figures 4, 7, 8 and 9, I provide a base 1 as a part of my standard illumination unit. The material of which the base is made is not a limitation upon my invention. The base may be a casting of metal or it may be a part molded of any suitable composition; but for cheapness I prefer to make it in the form of a sheet metal stamping, and I shall so describe it. The base is formed with rounded side edges 2 and 3, rounded corners and rounded end edges 4 and 5 intermediate which, however, there is preferably a depression 6, the purpose of which will hereinafter be set forth. Inside the edge portions I provide a slightly depressed platform 7 of generally rectangular configuration; and within the edges of this platform a central portion of the stamping is formed into a further depression 8 which, along the transverse center line of the structure, is preferably quite deep as shown in Figure 9. In the direction of the length of the structure the depression 8 becomes shallower near its ends. The center part of the depression 8 may be shaped to provide a reflector part 9 which may, if desired, be plated or polished to increase its reflectivity. Otherwise however, the entire surfaces of the depression 8 may be painted white or with aluminum paint for a similar purpose. The reflector part 9 is provided with a center orifice 10 to which, as shown in Figure 4, there may be attached a socket 11 to receive an electric bulb 12a. The socket may be mounted in the orifice 10 by crimping or upsetting or otherwise. The peripheral shape of the base is not a limitation on my invention.

The base 1 is preferably provided near its corners with perforations 13 for the passage of screws 13a or bolts whereby it may be attached to the ceiling, wall or other portion of a vehicle.

A protective gasket, shown at 14 in Figure 4, is preferably placed upon the platform 7. This gasket may be of rubber, felt, soft board, or other suitable material, and it may be held in place by bent tongues 15 struck from the metal of the platform.

A lens 16 of translucent substance, glass or plastic or its equivalent, is shaped to cover the bulb 12 and to have edges which lie against the gasket 14. The shape and nature of this lens form no necessary limitation upon my invention, for different types of diffused or beam illumination may be desired for different uses in different positions. In one useful type of structure I employ a glass lens suitably decorated with ribs or other configurations and translucent but frosted in its main body portion. There is, however, a central bull's-eye 17 of transparent substance, preferably convex and lens-shape on its outer surface and preferably provided on its inner surface with light-concentrating prismatic configurations. Such a lens provides some degree of diffuse illumination over a wide area and a concentrated beam of relatively high intensity from the bull's-eye portion.

The lens element has a lip 18 at each end; and in the end depressions 6 of the base member I slidably mount lens retaining clips 19. The depressions 6 are perforated as at 20, and the clips as shown in Figure 4 are slotted and are slidably held in place by rivets 21. The clips are preferably small sheet metal members having ends turned up and over as at 19a to engage the lips 18 of the lens. Their opposite ends may likewise be turned up as at 19b to provide engagement means for operating them. A slight transverse bending of the clips 19 intermediate their length will serve resiliently to hold them in position. These clips maintain the lens in position on the unit.

For the decoration of the exposed side portions 2 and 3 of the base member, in one decorative scheme, I provide lining or covering elements 22 in Figure 4. These are shown in elevation and cross section in Figures 15 and 16. They have curved portions 23 to engage over the curved side edge portions of the base and bottom lips 24 to engage under them. Their engagement is thus a spring engagement; and the elements may be made, say, of stainless steel or of highly polished or plated metal or of colored, oxidized aluminum, or of painted or lacquered metal, depending upon the requirements of the design. It will be noted that the use of these covering elements for the side edges of the base and the use of the end or connecting access members hereinafter described, by covering the base itself, permit the use of an otherwise unfinished or undecorated base excepting, as above pointed out, in the reflector portion.

Where a single illumination unit is desired, I provide end access or closure elements such as are shown at 25 in Figures 1 and 3. These may be made of stamped metal, in the form of die or other castings, or in the form of molded products since their shape is inherently a strong one. They will be suitably configured as with ribs or other decorations and suitably finished to conform with the design. Each such end member is provided with perforations 26 for the passage of screws fastening it to the base, and is so shaped as to cover not only the end of the base but also the lip portion 18 of the lens.

I prefer to make my end closure members of stamped metal, and passing screws through the holes 26 (which screws have grooves adjacent their heads), I prefer to upset the metal of the closures into these grooves so as to retain the screws captive. This is a great convenience during installation and during repairs. But where the screws are captive, as described, some provision must be made whereby the screws may be individually loosened and disengaged from the base without imposing undue strain upon the closures themselves. To this end, inside the hollow end portions 4 and 5 of the base I place the fixtures illustrated in Figures 10 and 11 at 27. These fixtures are strap-like members having at one end holes 28 through which may pass the rivets 29 (Figure 7) whereby the fixtures may be attached to the end portions of the base. Central depressed portions of the fixtures are perforated as at 30 to match with the perforations 13 of the base, and are also provided with upset threaded openings 31 to accept the screws on the end closure elements. The base likewise is perforated as at 32 so that the closure screws may engage with the threaded openings 31. As any one captive screw is unthreaded the fixture in which it is engaged can bend downwardly from the base portion 4 or 5. This permits the individual loosening of the screws.

As shown in Figure 5, my assembled individual unit is of attractive and compact appearance. Individual units may be joined as shown in Figure 6 by having their bases fastened in endwise juxtaposition to the ceiling or wall and by the use of a common closure member 33 to cover the juxtaposed base ends. The member 33 is preferably made as a die casting or molded product so as to provide on its inner surface stiffening ribs. It is provided with four screws 34 engageable with the fixtures of the respective bases as hereinabove described.

In many installations individual units are desired in elongated lines, and it will be evident that through the use of connecting closures 33 as many of the individual units may be ganged together as the designer wishes. In other installations it is desired to have units ganged together but spaced from each other so that the total number of units in any assembly becomes less. For this purpose I employ a connector strip illustrated in Figures 13 and 14. This may be a strip of pressed metal suitably configured to match the other closure members and produced in relatively long lengths, say, 4 feet, so that it may be cut into individual sections of desired lesser lengths as required by the designer. The strip 35 may also, however, be made as a molded product or as a die casting with or without strengthening ribs. In any event, its inner edges are turned or beaded as at 36; and the strip is used with a fixture 37 of strip-like form having upturned edges 38. These fixtures are attached to the wall or ceiling by means of screws or bolts 39 and their turned up edges are so shaped that the strip element 35 will engage over them and be held in place. The number of fixtures 37 employed with any given length of strip will be appropriate to that length. End portions of the cut lengths of strip may, if desired, be perforated as at 40 for the passage of screws to fasten the strip ends to the respective bases.

By means of the strips, connectors and end closure pieces which I have described a very wide variety of gang assemblies may be made. Connector members of curved or angular shapes may be made where a gang assembly of illumination units is to turn a corner as at 35a in Figure 17 or follow an angular or curving line in a vehicle. Some of these arrangements are shown in Figure 17. In the light of my teachings it will also be clear to the skilled worker how T-shaped or cross-shaped connecting elements may be provided where one line of illumination units is to join another or where lines of illumination units are to cross.

Modifications may be made in my invention without departing from the spirit of it. Having thus described my invention, what I claim as new and desire to secure by Letters Patent is:

1. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens.

2. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket.

3. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket, said base having means whereby it may be attached permanently to a support, and decorative elements for covering the ends of said base, at least one of said decorative elements having means for engagement with said base.

4. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket, said base having means whereby it may be attached permanently to a support, and decorative elements for covering the ends of said base, at least one of said decorative elements having means for engagement with said base, said means comprising captive screws in said decorative end covering element, said base within its raised end portions having resilient strips attached to it, said strips being capable of bending and having threaded openings therein to receive said screws, the end portions of said base having matching perforations to permit passage of said screws, the resilient character of said strips permitting successive loosening of said captive screws without imposing strain on said decorative covering elements.

5. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket, said base having means whereby it may be attached permanently to a support, and decorative elements for covering the ends of said base, at least one of said decorative elements having means for engagement with said base, said means comprising captive screws in said decorative end covering element, said base within its raised end portions having resilient strips attached to it, said strips being capable of bending and having threaded openings therein to receive said screws, the end portions of said base having matching perforations to permit passage of said screws, the resilient character of said strips permitting successive loosening of said captive screws without imposing strain on said decorative covering elements, one at least of said decorative covering elements being so shaped as to cover and be fastened to the ends of two such bases in juxtaposition whereby illuminating units may be joined into an integrated group.

6. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket, said base having means whereby it may be attached permanently to a support, and decorative elements for covering the ends of said base, at least one of said decorative elements having means for engagement with said base, said means comprising captive screws in said decorative end covering element, said base within its raised end portions having resilient strips attached to it, said strips being capable of bending and having threaded openings therein to receive said screws, the end portions of said base having matching perforations to permit passage of said screws, the resilient character of said strips permitting successive loosening of said captive screws without imposing strain on said decorative covering elements, one at least of said decorative covering elemens being so shaped as to cover and be fastened to the ends of two such bases in juxtaposition whereby illuminating units may be joined into an integrated group, and resiliently engageable decorative means for covering the exposed side portions of said base.

7. In an illumination element, a pressed metal base of elongated rectangular form having raised, curved marginal portions, a depressed platform portion located inwardly of the marginal portions, and a central further depressed portion for housing an incandescent bulb, a lens element shaped to cover said bulb and having peripheral portions for engagement with said platform, and means for holding said lens to said base, said means comprising slotted engagement elements slidably mounted on said base for movement toward and away from said lens, said lens having lips at its ends, and said slotted elements having portions which in one position will engage over said lips to retain said lens, a gasket lying between said platform and said peripheral portions of said lens, and means comprising metal tongues struck from said platform to engage and retain said gasket, said base having means whereby it may be attached permanently to a support, and decorative elements for covering the ends of said base, at least one of said decorative elements having means for engagement with said base, said means comprising captive screws in said decorative end covering element, said base within its raised end portions having resilient strips attached to it, said strips being capable of bending and having threaded openings therein to receive said screws, the end portions of said base having matching perforations to permit passage of said screws, the resilient character of said strips permitting successive loosening of said captive screws without imposing strain on said decorative covering elements, one at least of said decorative covering elements being so shaped as to cover and be fastened to the ends of two such bases whereby illuminating units may be joined into an integrated group, and resiliently engageable decorative means for covering the exposed side portions of said base, one at least of said decorative end covering elements being in strip form and of substantial length whereby bases may be joined in spite of substantial spacing therebetween, intermediate portions of said strip-like covering member being engaged with clips attachable to the support to which said bases are attached.

WAGN TRAUTNER.

REFERENCES CITED

The following references are of record in the file of this patent:

UNITED STATES PATENTS

| Number | Name | Date |
|---|---|---|
| 2,156,621 | Doane | May 2, 1939. |
| 2,167,383 | Arenberg | July 25, 1939 |
| 2,249,357 | Graham | July 15, 1941 |
| 2,338,559 | Winkelmeyer | Jan. 4, 1944 |
| D. 129,640 | Zimmerman et al. | Sept. 23, 1941 |
| 1,996,597 | Sweet | Apr. 2, 1935 |
| 2,306,700 | Kantack | Dec. 29, 1942 |
| 1,648,167 | Donley | Nov. 8, 1927 |
| 1,884,076 | Michel | Oct. 25, 1932 |
| 2,332,040 | Zampol | Oct. 19, 1943 |